(12) United States Patent
Chludzinski et al.

(10) Patent No.: US 9,273,908 B2
(45) Date of Patent: Mar. 1, 2016

(54) METHOD AND DEVICE FOR SELF-ACTING HEAT TRANSFER IN A DIRECTION REVERSE TO NATURAL CONVECTION

(75) Inventors: Daniel Chludzinski, Maly Plock (PL); Jurij Dobrianski, Olsztyn (PL); Michal Duda, Orzysz (PL); Janusz Piechocki, Olsztyn (PL); Marek Samsel, Filipow (PL); Robert Wojcik, Olsztyn (PL)

(73) Assignee: Uniwersytet Warminsko—Mazurski w Olsztynie, Olszlyn (PL)

( * ) Notice: Subject to any disclaimer, the term of this patent is extended or adjusted under 35 U.S.C. 154(b) by 429 days.

(21) Appl. No.: 13/808,265

(22) PCT Filed: Jul. 15, 2011

(86) PCT No.: PCT/PL2011/000077
§ 371 (c)(1),
(2), (4) Date: Jan. 4, 2013

(87) PCT Pub. No.: WO2012/015321
PCT Pub. Date: Feb. 2, 2012

(65) Prior Publication Data
US 2013/0105117 A1 May 2, 2013

(30) Foreign Application Priority Data
Jul. 26, 2010 (PL) .......................... 391961

(51) Int. Cl.
| F28D 15/02 | (2006.01) |
|---|---|
| F28D 15/00 | (2006.01) |
| F28D 15/06 | (2006.01) |
| F28F 23/00 | (2006.01) |
| F28F 27/00 | (2006.01) |

(52) U.S. Cl.
CPC ................ *F28D 15/02* (2013.01); *F28D 15/00* (2013.01); *F28D 15/025* (2013.01);
(Continued)

(58) Field of Classification Search
CPC .... F28D 15/02; F28D 15/025; F28D 15/0266
USPC ............ 165/104.22, 104.25, 104.28, 104.31;
417/118, 119, 126, 127, 134, 136
See application file for complete search history.

(56) References Cited

U.S. PATENT DOCUMENTS

| 4,061,131 A | 12/1977 | Bohanon |
|---|---|---|
| 4,745,906 A | 5/1988 | Debeni et al. |

(Continued)

FOREIGN PATENT DOCUMENTS

| DE | 4125423 A1 | 2/1992 |
|---|---|---|
| EP | 0456508 A2 | 11/1991 |

(Continued)

*Primary Examiner* — Leonard R Leo
(74) *Attorney, Agent, or Firm* — Sutherland Asbill & Brennan LLP

(57) ABSTRACT

According to the present invention, the method of heat transfer in a direction, which is reverse to natural convection, includes introduction of an additional pumping substance into the heated area. The pumping substance is incapable to be dissolved in the heat-transfer agent and its boiling temperature is lower than the boiling temperature of the heat-transfer agent. The heat-transfer agent is heated up, the pumping substance evaporates and the vapor pressure of the pumping substance is used to force the hot heat-transfer agent to flow along the branches of the circulating loop. The device for heat transfer in a direction reverse to the natural convection characterized in that its design incorporates technical means intended for vapor condensation of the pumping substance as well as technical means intended for draining that condensate from the condensation area to the evaporation area.

4 Claims, 5 Drawing Sheets

(52) U.S. Cl.
 CPC ........... *F28D 15/0266* (2013.01); *F28D 15/06* (2013.01); *F28F 23/00* (2013.01); *F28F 27/00* (2013.01); *F28F 2250/08* (2013.01)

(56) References Cited

U.S. PATENT DOCUMENTS

| | | |
|---|---|---|
| 5,259,447 A | 11/1993 | Ogushi et al. |
| 5,351,488 A * | 10/1994 | Sorensen ............... 165/104.22 |

FOREIGN PATENT DOCUMENTS

| | | |
|---|---|---|
| EP | 0890798 A2 | 1/1999 |
| GB | 1552309 A | 9/1979 |
| GB | 2103782 A | 2/1983 |
| JP | 60 259892 | 12/1985 |
| JP | 2005274 A | 10/2005 |
| PL | 192167 B1 | 7/2001 |
| PL | 195490 B1 | 10/2001 |
| PL | 197643 B1 | 7/2002 |

* cited by examiner

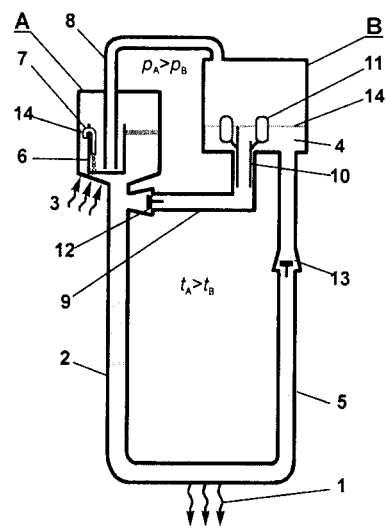
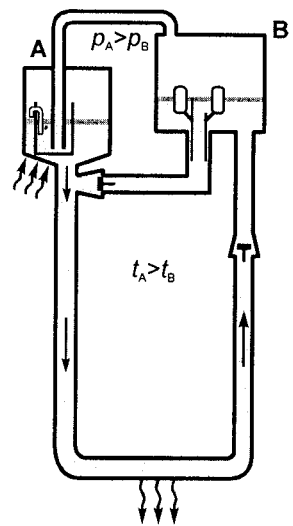
Fig. 1
Fig. 2
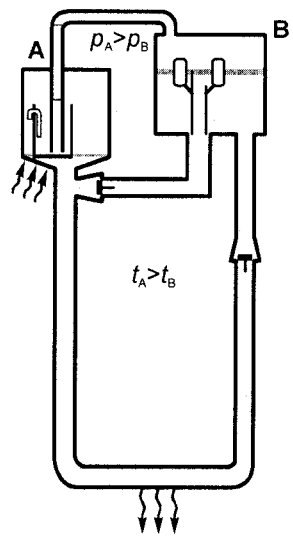
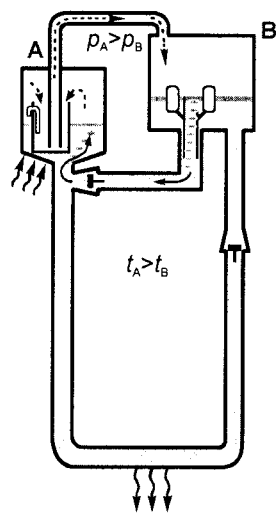
Fig. 3
Fig. 4

METHOD AND DEVICE FOR SELF-ACTING HEAT TRANSFER IN A DIRECTION REVERSE TO NATURAL CONVECTION

BACKGROUND OF THE INVENTION

The present invention concerns a method and device for self-acting heat transfer in a direction reverse to natural convection. Both the method and the device can be used in various sectors of the economy for heating facilities situated below the sources of heat, e.g. for the transfer of heat from solar collectors to a tank situated below, for warming liquefied petroleum gases (propane-butane) in underground gas storage at a time of high output, to heat the ground under highways, airport runways and driveways to garages, in greenhouses or hotbeds and for transfer of waste heat recovered from chimney gases, etc.

DESCRIPTION OF THE RELATED ART

Description of patent PL 192167 discloses a method and device for heat transfer in a direction reverse to natural convection. The method, according to the patent PL 192167, consists in a technique where a gas-liquid solution, for instance a solution of carbon dioxide in water, is used as a heat-transfer agent in a cyclically-operating circulating loop. The circulation loop is incompletely filled with liquid. The liquid heat-transfer agent, saturated with gas, is heated up in the upper part of the falling branch of the loop. The dissolved gas s is desorbed from the solution, and its pressure pushes down the diluted hot heat-transfer agent downwards through the falling branch. In the bottom part of the loop, the heat-transfer agent is cooled down and subsequently flows into the rising branch. Consequently, the level of the liquid rises in the rising branch; volume of gas above the cold and diluted solution decreases and the gas is dissolved therein.

When a certain difference of pressure and difference of levels between the cold and hot branches is reached, a passage in the upper part of the loop is being opened, and gas is flowing through the passage from the hot falling branch to the upper part of the cold rising branch. Simultaneously, the excess of enriched cold solution is flowing down by gravity via an intermediate channel from the cold rising branch to the upper part of the hot falling branch. The passage in the upper part of the loop is then closed and the cycle is repeated.

The device according to with the patent PL 192167 is made up of a closed circulating loop with two branches: a rising one and a falling one, a mass exchanger designed to dissolve the gas which is located in the upper part of the rising branch as well as a gas container with flexible walls connected to the mass exchanger. The upper part of the falling branch incorporates a heater and a cooler is placed in the bottom part of the loop. In addition, the circulating loop is provided with an intermediate channel for connecting the upper descending part with the upper ascending part where the channel inlet is placed below the level of liquid. Moreover, the circulation loop comprises a control valve of liquid seal type which is located at upper part of the falling branch whilst the passage pipe of the liquid seal is connected to the upper part of the rising branch. The liquid seal is automatically opened and closed depending on the pressure difference between these two branches, thus also depending on the difference of liquid levels in these branches. In order to achieve unidirectional flow of heat-transfer agent in the loop, i.e. from the hot falling branch via the cooler to the cold rising branch, as well as from the upper part of the cold rising branch via the intermediate channel to the upper part of the hot falling branch, check valves are fitted onto the flow pathways.

SUMMARY OF THE INVENTION

According to the present invention, the method of heat transfer in a direction, which is reverse to natural convection, consists in introduction of an additional pumping substance into the heated area. The pumping substance is incapable to be dissolved in the heat-transfer agent and its boiling temperature is lower than the boiling temperature of the heat-transfer agent. The heat-transfer agent is heated up, the pumping substance evaporates and the vapour pressure of the pumping substance is used to force the hot heat-transfer agent to flow along the branches of the circulating loop. Next, the spent vapour of the of the pumping substance is transferred from the upper part of the hot falling branch to an area with lower temperature, where the vapour is condensated. The obtained condensate is subsequently reintroduced to the heated zone. The amount of the pumping substance is not less than that which is necessary to fill the remaining volume of the circulating loop which is unoccupied by the liquid heat-transfer agent with its vapour and to fill the drainage pathway of the condensate leading from the condensation area to the evaporation area. The density of the pumping substance should preferably be less than the density of the heat-transfer agent.

According to the present invention, the device for heat transfer in a direction reverse to natural convection is designed as a closed flow circuit which incorporates two branches: a hot falling one and a cold rising one, where both branches are mutually connected via a cooler located in the bottom part of the loop, while in the upper part these branches are terminated in two vessels: a hot fluid one and a cold fluid one. The device has also a control valve which is a liquid-seal type with a passage pipe meant for connecting vapour areas of the above-mentioned vessels and an intermediate channel for draining the heat-transfer agent from the cold fluid vessel to the hot fluid one. It also has check valves for assurance an unidirectional flow of liquids in the loop's branches and in the intermediate channel. The device is characterized in such a way that its design includes technical means for vapour condensation of the pumping substance as well as technical means for draining down that condensate from the condensation area to the evaporation area.

According to the present invention, the device is characterized in such a way that the means for vapour condensation of the pumping substance is the cold heat-transfer agent stored in the cold fluid vessel and vapour of the pumping substance is condensed by a direct contact with said agent.

According to the present invention, the means for draining the condensate of the pumping substance to the evaporation area is an intermediate channel with a telescopic pipe at its inlet. The pipe is fixed in such a way that it has the possibility of unrestricted vertical movements inside the intermediate channel, whereas the inlet of said pipe is located outside the intermediate channel and is held just below the surface of liquid in the cold fluid vessel by means of a float.

Another embodiment of the device according to the present invention is that the means for drainage of condensate of the pumping substance to evaporation area is a collecting funnel fitted at the inlet to the intermediate channel. The inlet with a funnel is located above the bottom of cold fluid vessel, whereas the intermediate channel has a second inlet below the collecting funnel just above the bottom of the cold vessel. The position of the funnel, the cross-section of that second inlet and hydraulic resistance of the intermediate channel are adjusted in such a way that the level of liquid in intermediate channel is below that second inlet when the liquid level falls below the collecting funnel during draining operation.

A further embodiment of the invented device is that it has an air-cooled condenser, a pipe for conveying vapours from the upper part of the cold fluid vessel to the upper part of the condenser as well as a drainage channel for condensate. The outlet of said channel for drainage of condensate is placed below the liquid surface inside the hot fluid vessel and the height of said channel is deliberately adjusted so that the hydrostatic pressure of the condensate column of the pumping substance at the channel outlet exceeds the hydrostatic pressure of the heat-transfer agent inside the hot fluid vessel at the point of the outlet out of the drainage channel.

Another embodiment of the device according to the present invention is characterized in that the means for vapour condensation of the pumping substance is a surface heat exchanger. One pass of the exchanger is supplied with spent vapour of the pumping substance whilst the other pass is supplied with the cold heat transfer agent. The heat exchanger is placed above the evaporation area in such a way that the accumulated condensate is drained down by the gravitational force to the heated area, whereas the outlet of the channel for draining condensate is located in the heated area below the liquid level and the height of the channel for draining condensate is purposefully adjusted in such a way that the hydrostatic pressure of condensate inside the channel exceeds at its outlet the pressure of the heat transfer agent inside the hot fluid vessel at the outlet from said channel.

The device for heat transfer in the direction reverse to the natural convection that is designed in the form of a flow circuit which is comprised of two branches, namely the hot falling one and the cold rising one, wherein the both said branches are interconnected at the bottom side via a cooler and at the upper side they are ended with two vessels, namely a hot fluid vessel and a cold fluid vessel respectively; said device has also a control valve that is made as a liquid seal that is made as a liquid seal with the passage channel for interconnection vapour areas of said vessels with the purpose of pressure compensation, and an intermediate channel for draining down the heat transfer agent, and check valves for providing unidirectional flow of liquids, characterized in that the control valve has a float/connected to flap and placed inside the dosaging vessel of said liquid seal while an additional float is placed directly inside the hot fluid vessel and a string mechanism, which connects the both said floats and enables them limited range of free motion.

The device for transfer of heat towards a direction that is reverse to natural convection is characterized in that it has a vessel with a flexible anti-vacuum membrane intended for protecting the device against a pressure drop inside the device below the atmospheric pressure, which is open to the surrounding environment and provided with an anti-vacuum membrane, wherein the heat transfer agent is on one side of said membrane while on the other side of the membrane is medium under the ambient pressure, and the working capacity of said vessel is not less than the volume occupied by the vapour of the pumping substance, when the pressure in the device is equal or greater of ambient pressure.

The method according to the present invention makes it possible to simultaneously benefit from the advantages of both water and refrigerants. For operational performance, water and its solutions are the most convenient heat-transfer agents. In turn, refrigerants serve as efficient pumping agents because the pressure of their saturated vapours within the temperature range from 0° C. to 100° C. is higher than the atmospheric pressure. This prevents the penetration of atmospheric air into the interior of the apparatuses, inasmuch as such penetration would disable the condensation process for vapours of the pumping substance. Equipment of the type in question may use environment-friendly pumping substances (hydrocarbons, for example) which are much less hazardous to the environment than conventional refrigerants. Another important factor is also the quantity of the pumping substance, which is very small for the present invention and only amounts to about 10 grams per 1 kW of transferred heat power.

BRIEF DESCRIPTION OF THE DRAWINGS

The subject matter of the present invention shall be explained in more detail below with reference to specific embodiments and the attached drawings.

FIGS. 1, 2, 3 and 4 present a schematic diagram of the device with a movable (telescopic, collapsible) inlet to the intermediate channel during subsequent phases of the device operation;

DESCRIPTION OF THE PREFERRED EMBODIMENTS

Figure 5:
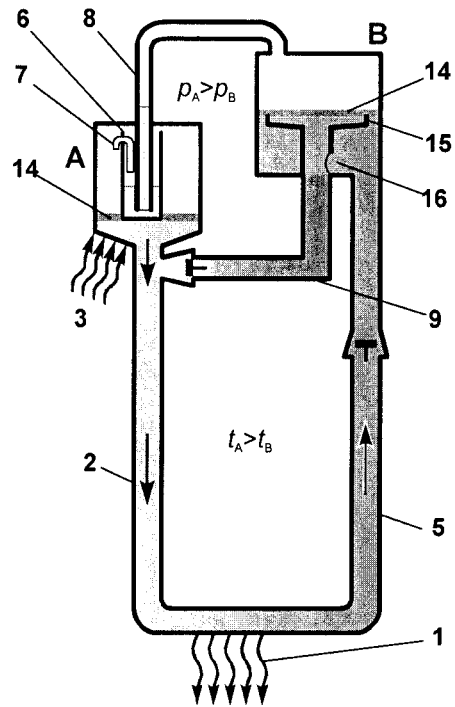
FIGS. 5, 6 and 7 show a schematic diagram of the device with a collecting funnel.

The method of heat transfer in the direction reverse to the natural convection characterized in that an additional pumping substance, which has boiling point lower than the boiling point of the heat transfer agent and is insoluble in said agent, is introduced into the heating area. Next, the heat transfer agent is heated up to evaporate the pumping substance and the resulted vapour pressure of the pumping substance is used to force the hot heat-transfer agent along the branches of the circulating loop, while the spent vapour of the pumping substance is transferred from the upper part of the hot falling branch to the area of lower temperature where the substance is being condensed. Subsequently, the condensate is reintroduced to the heating area. The amount of pumping substance is not less than it is necessary to fill with its vapour the remaining volume of the circulating loop that is not occupied by the liquid heat transfer agent as well as to fill the condensate drainage pathway from the condensation area to the evaporation area. The density of the pumping substance introduced to the closed circulating loop partly filled with a liquid heat-transfer agent should be preferably less than the density of the heat-transfer agent.

The device for heat transfer in a direction reverse to natural convection is designed to incorporate technical means intended for vapour condensation of the pumping substance and includes technical means to drain condensate from the condensation area to the evaporation area. The means intended for vapour condensation of the pumping substance is the cold heat-transfer agent stored in the cold expansion vessel /B/ and the vapour of the pumping substance is condensed by direct contact with that heat transfer agent. The means intended to drain vapour condensate accumulated inside the device is the intermediate channel /9/ terminated with an telescopic pipe /10/ fixed in such a way that it has the possibility of unrestricted vertical movements inside the intermediate channel /9/, whereas the inlet of that pipe is located outside the intermediate channel and is held just below the liquid surface in the cold fluid vessel by means of floats /11/.

The means for draining vapour condensate of the pumping substance from the condensation area to the evaporation area is a funnel /15/ fitted at the inlet /16/ to the intermediate channel leading to its end located above the cold fluid vessel /B/ bottom, whereas the intermediate channel /9/ has a second inlet /16/ below the collecting funnel /15/. The cross-section of that second inlet and hydraulic resistance of the intermediate channel are adjusted in such a way that when the level of heat-transfer agent inside the cold fluid vessel /B/ is below the collecting funnel /15/, the level of heat-transfer agent inside the intermediate channel is below the second inlet /16/.

The device has a condenser /17/ which remains in thermal contact with the ambient environment, a pipe /21/ meant to convey vapour to the condenser and leading from the upper part of the cold fluid vessel /B/ to the upper part of the condenser /17/ as well as a draining channel /19/ for condensate, whereas the condenser /17/ is placed above the hot fluid vessel /A/ at such a height that the hydrostatic pressure of the condensate at the outlet of the drainage channel /19/ exceeds the pressure inside the hot fluid vessel /A/ at the location where the outlet of the drainage channel /19/ is found.

The condenser implemented as a heat exchanger /17/, one passage of which is connected from one side to the cold rising branch /5/ and the channel /20/ meant to drain the cold carrier. The other passage of the heat exchanger is connected from one side with a channel /18/ for transfer of vapour from cold fluid vessel /B/ and is connected on other side with a channel /19/ intended for the condensate drainage. The outlet of the latter channel is placed below the level of the liquid surface, in the bottom part of the hot fluid vessel /A/. The height of the channel /19/ is deliberately adjusted so that the hydrostatic pressure of condensate collected inside the channel at its outlet exceeds the pressure inside the hot fluid vessel /A/ at the location of the outlet from the channel.

The device for heat transfer in the direction reverse to the natural convection is characterized in that the control valve /6/, /7/, /8/ designed in the form of the liquid seal has a float /21/ connected to a flap /22/ and placed inside the dosaging vessel /6/ of said liquid seal while an additional float /23/ is placed directly inside the hot fluid vessel /A/ and a string mechanism /24/ which connects said both floats.

In order to protect the device against a pressure drop inside the device below the atmospheric pressure, the device has a pressure extension vessel /25/ open to the ambient environment with an anti-vacuum membrane /26/. The heat-transfer agent is delivered to one side of the membrane /26/ while the other side of the membrane is in contact with medium at the ambient pressure and the working capacity of the vessel is not less than the volume occupied by the vapour of the pumping substance when the pressure in the device is equal or greater of ambient pressure.

Embodiment 1

This method assumes that an additional pumping substance is introduced into the heated area flow circuit. This substance has less density than the liquid heat-transfer agent, is insoluble in the heat-transfer agent and its boiling temperature is lower than the respective boiling temperature of the heat-transfer agent. Pentane is used as the pumping substance as its boiling temperature at atmospheric pressure is 36.1° C. Next, the heat-transfer agent is heated up, the pumping substance is evaporated and the vapour pressure of the pumping substance forces the heat-transfer agent to circulate in the branches of the circulating loop. The spent vapour of the pumping substance is transferred from the upper part of the hot falling branch to the zone with a lower temperature where the vapour is subject to condensation. The condensate is then reintroduced into the heated area and the amount of the pumping substance is not less than its vapour mass necessary to fill up the part of the circulating loop that is not occupied by the liquid heat-transfer agent as well as to fill the condensate drainage passage which is leading from the condensation area to the evaporation area.

Embodiment 2

The schematic diagram of the device according to the present invention is shown in FIG. 1. It is made as a closed circulating loop that includes a cooler 1 to which the liquid heat-transfer agent 4 (already heated up in the hot fluid vessel A with use of the heat source 3) is delivered via the hot falling branch 2. The cooled heat-transfer agent leaves the cooler via the cold rising branch 5 and is delivered into the cold fluid vessel B. Moreover, the device has a control valve of liquid seal type, which is placed inside the hot fluid vessel A, and consisted of the dosing vessel 6, a filling siphon 7 and a passage pipe 8. The inlet of the passage pipe 8 is placed near the bottom of the dosing vessel 6 whilst its outlet—in the upper part of the cold fluid vessel B. The device also has an intermediate channel 9 with one of its ends connected with the hot branch 2 just below hot fluid vessel A. The second end of the pipe is fitted in the bottom of cold fluid vessel B. The telescopic pipe 10 in introduced into the intermediate channel 9 from the side of the cold fluid vessel B where the pipe is capable of unrestricted movement along the vertical direction. The free end of the telescopic pipe 10 is provided with floats 11 which are sized so that the inlet to the telescopic pipe is located just below the liquid surface inside vessel B. In addition, the intermediate channel 9 and cold rising branch 5 are provided with check valves 12 and 13.

The device is filled with a liquid heat-transfer agent 4 in such a way that the liquid surface of heat-transfer agent inside cold fluid vessel B is higher than the level which is achieved by the heat-transfer agent in hot fluid vessel A at the moment when the control valve is being closed. In addition, the circulating loop also comprises the liquid pumping substance 14, e.g. pentane, in an amount which is necessary to fill the remaining volume of the loop that is not filled by the fluid with saturated vapour and is sufficient to generate necessary working pressure inside hot fluid vessel A. This is high enough for a one-shot forcing of a volume of the heated carrier as set by the control valve and for forwarding that volume via the cooler 1 to the cold fluid vessel B.

Vapour of the pumping substance is transferred to the cold fluid vessel B via the passage pipe 8 during the phase of the heat-transfer agent drainage. This spent vapour is condensed in that vessel due to direct contact with the cold heat transfer agent and condensate forms a layer which floats on the heat-transfer agent. The condensate is then drained via the intermediate channel 9 together with the heat-transfer agent during the subsequent phase of its drainage, whereas drainage of the condensate from the pumping substance is enabled via the telescopic pipe 10.

The device is operated in a cyclical manner, whereas the working cycle is made up of two phases: pumping of the heated heat-transfer agent from the hot fluid vessel A via the cooler 1 to the cold fluid vessel B with subsequent draining of the cold heat-transfer agent together with the condensate of the pumping substance from cold fluid vessel B to hot fluid vessel A.

A beginning of the pumping phase corresponds to the moment, when the liquid level inside the vessel A reaches an elbow of the filling siphon that has served as a passageway for filling the dosing vessel 6 with the liquid. Therefore the liquid level prevents vapours generated by the pumping substance from transfer to the vessel B—FIG. 1. In consequence of supplying more heat to the vessel A the amount of vapour generated by the pumping substance is increased along with its pressure inside the vessel, which results in reversing the flow direction of the liquid, closing the check valve 12 in the intermediate channel 9 and opening the check valve 13 in the branch 5. The heated heat transfer agent is displaced from the vessel A by vapours of the pumping substance, flows via the cooler 1 and reaches the vessel B. As the vessel B is filling gradually with the cooled-down heat transfer agent, the vapours of the pumping substance collected inside said vessel is condensing. The flow direction of the heat transfer agent as well as the states of the check valves and the control valve during the pumping phase is shown in FIG. 2.

When the vapour pressure of the pumping substance inside the vessel A exceeds the hydrostatic pressure of the liquid in the passage pipe 8, the liquid heat transfer agent is forced from the dosing vessel 6 via the passage pipe 8 to the vessel B—FIG. 3. After the dosing vessel 6 has been emptied via the passage pipe, the spent vapour of the pumping substance flows from the vessel A to the vessel B, which results in equalizing the vapour pressure in both vessels and thus beginning the drain-down phase. Due to pressure of the fluid stream that leaves the vessel B, the check valve 13 in the branch 5 is being closed down while the check valve 12 in the intermediate channel 9 is being open. Consequently, the fluid from the vessel B is drained down due to gravity via the intermediate channel 9 to the vessel A, while the flow of the heat transfer agent is accompanied by simultaneous flow of vapours to the vessel B via the passage pipe 8. Within the vessel B the heat transfer agent flown into the intermediate channel 9 via the telescopic pipe 10. The inlet of the telescopic pipe is held close below the liquid level by means of the floats 11, thus providing the heat transfer agent flow from the upper layers to said channel along with condensate of the pumping substance 14. The flow direction of the heat transfer agent, of vapour of the pumping substance as well as the states of the check valves during the drain-down phase are shown in FIG. 4.

Embodiment 3

Another example of the device described as embodiment 2 of the present invention is the device shown in FIG. 5, where condensate of the pumping substance collected in the cold fluid vessel B is supplied to the intermediate channel 9 via a collecting funnel 15 fitted on the inlet of said channel. The intermediate channel 9 is raised above the bottom of the cold fluid vessel B and the elevation of the channel inlet, and thus the point where the collecting funnel is fitted, is placed between the maximum level to which the cold fluid vessel B is filled at the end of the pumping phase and the minimum level of the vessel to which said vessel is filled at the end of the drain down phase. Moreover, the intermediate channel 9 has an additional inlet 16 with the cross-sectional area of $F_2$ placed close above the bottom of the cold fluid vessel B. The cross-sectional area has to be determined for a specific device individually and calculated using the formula:

$$F_2 \leq \sqrt{\frac{h_0 - h_2}{h_2} \frac{\xi_2}{\sum_{i=1}^{l} \frac{\xi_{li}}{F_{li}^2}}},$$

where: $F_{li}$—cross section of individual components within the bottom part of the intermediate channel, $\xi_2$—resistance coefficient for the inlet with the $F_2$ cross section, $\xi_{li}$—resistance coefficient for individual components of the bottom part of the intermediate channel, $h_0$—level difference for the liquids inside the hot fluid vessel A and the cold fluid vessel B. $h_2$—height of the liquid column inside the B vessel above the inlet 16.

Figure 6:
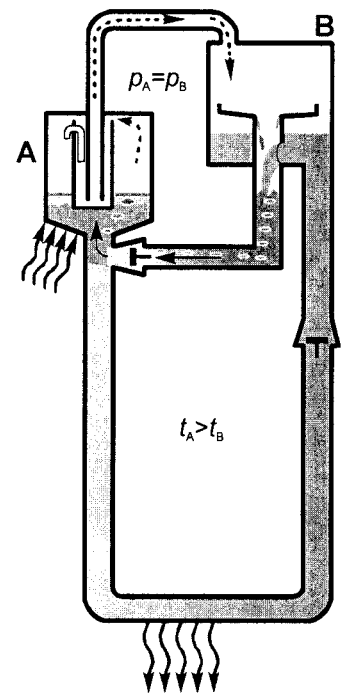
Figure 7:
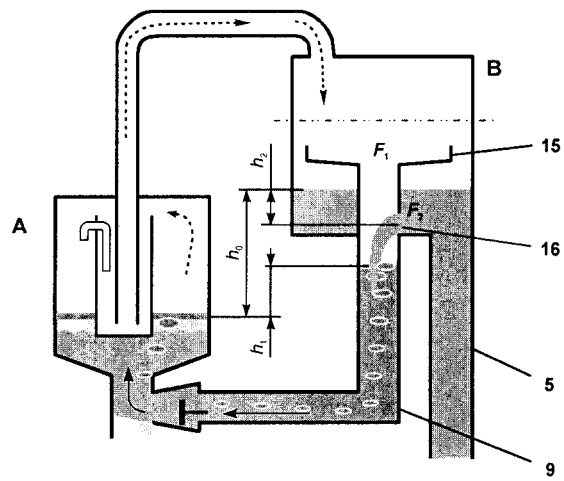

During the first phase of the drain-down process the liquid flows into the intermediate channel via two inlets at the same time: via the inlet placed inside the collecting funnel 15 and via the additional inlet 16 placed below said funnel. After the fluid level inside the vessel B has been decreased below the funnel edge, condensate of the pumping substance is supplied to the intermediate channel via the funnel, whereas the liquid level inside that channel drops below the additional inlet 16—FIG. 6. The condensate being present within the intermediate channel is mixed with the heat transfer agent stream that flows into the channel via the additional inlet 16 and together with the heat transfer agent reaches the hot fluid vessel A. FIG. 7 shows the difference between liquid levels within the hot fluid vessel A, the cold fluid vessel B and the intermediate channel 9. That level difference provides the driving force for mixing the condensate with the liquid heat transfer agent and draining down this mixture from the intermediate channel to the hot fluid vessel A.

Embodiment 4

Condenser

Figure 8:
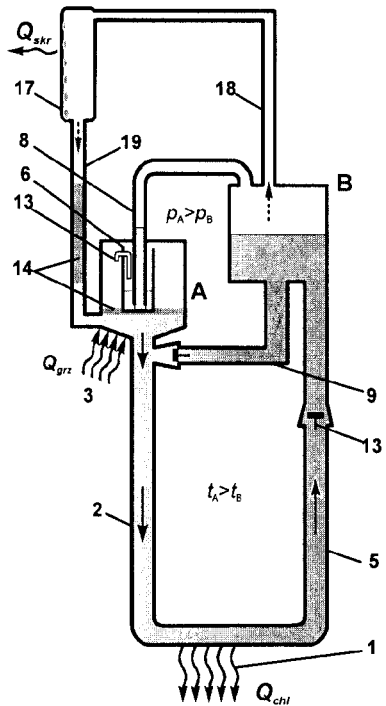
FIGS. 8, 9 and 10 show a schematic diagram of the device with a membrane-type heat exchanger and drainage of condensate to the hot vessel.

Another embodiment of the device described above as embodiments 2 and 3 of the present invention is shown in FIG. 8. In this case the vapour of the pumping substance is condensed inside the condenser 17 and the condensation heat is dissipated into the ambient environment. The spent vapour is supplied to the condenser 17 via the channel 18 that has the inlet located in the upper part of the cold fluid vessel B, and leaves the condenser in the form of condensate via the drainage channel 19, while the cold heat transfer agent is drained down via the intermediate channel 9 that has the inlet located in the bottom of the cold fluid vessel B.

The outlet of the drainage channel 19 is placed inside the hot fluid vessel A close to the bottom and below the liquid level, whereas the condenser 17 is placed above the hot fluid vessel A at the height not less than the value calculated from the equation $$h_{cond} \geq h_{cv}^B \frac{\rho_{cv}}{\rho_{cond}},$$

where: $h_{c.v}^B$—level of liquid surface inside the cold fluid vessel B measured from the outlet of the drainage channel 19, $\rho_{cond}$—density of condensate inside the drainage channel 19, $\rho_{c.v}$—density of liquid inside the vessel B Meeting the foregoing requirements (accomplishment of the foregoing conditions) guarantees that condensate of the pumping substance can be drained from the drainage channel 19 to hot fluid vessel A.

Embodiment 5

Heat Exchanger—Condenser

In contrary to the embodiment 4 of the device, in this embodiment of the present invention (FIG. 9), vapour of the pumping substance is condensed in a membrane-type heat exchanger—condenser 17 which is supplied with a cold heat-transfer agent forwarded directly via the rising branch 5 from the cooler 1. Subsequently, the heat-transfer agent leaves the heat exchanger via the channel 20 and reaches cold fluid vessel B.

Figure 9:
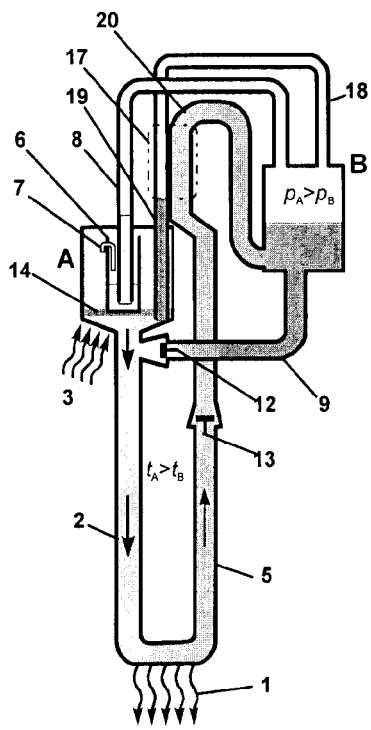
Figure 10:
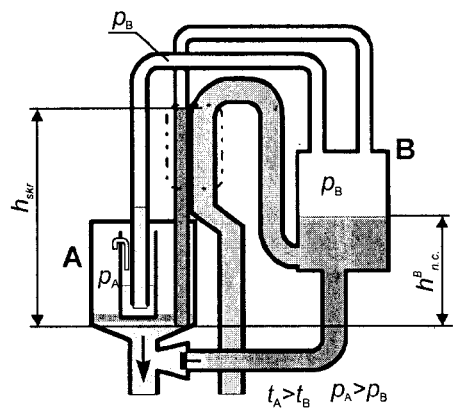

The outlet of the channel 20 is placed below the level of the liquid in the bottom part of the cold fluid vessel B (FIG. 9). During the drainage phase, the vapour of the pumping substance is supplied via the control valve to vessel B and is then forwarded to the heat exchanger 17 via the channel 18 where it is condensed with giving up the condensation heat via the membrane to the cold heat-transfer agent that flows throughout the heat exchanger. Condensate of the pumping substance is accumulated in the drainage channel 19. When hydrostatic pressure of the condensate measured at the channel outlet placed inside the hot fluid vessel A below the level of the liquid surface and at the bottom of the vessel exceeds pressure of the pumping vapour and the heat-transfer agent column at that location, the condensate from the drainage channel is drained into vessel A. In order to enable gravitational drainage of the condensate from channel 19 to the vessel A, the height of the channel and therefore the elevation where the heat exchanger 17 is fitted must not be less than the value calculated from the equation $$h_{cond} \geq h^B_{c.v} \frac{\rho_{c.v}}{\rho_{cond}},$$

where: $h^B_{c.v}$—level of liquid surface inside the cold fluid vessel B measured from the outlet of the drainage channel 19, $\rho_{cond}$—density of condensate inside the drainage channel 19, $\rho_{c.v}$—density of liquid inside the vessel B—FIG. 10

Embodiment 6

Float Valve

Figures 11, 12:
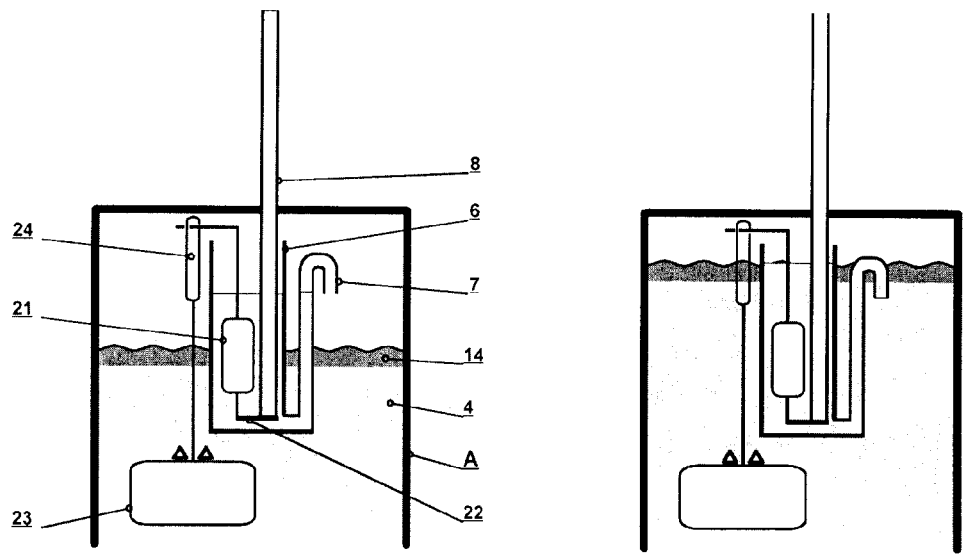
FIGS. 11, 12 and 13 serve as an example for implementation of the control valve in the form of a liquid seal with a float valve.
Figure 13:
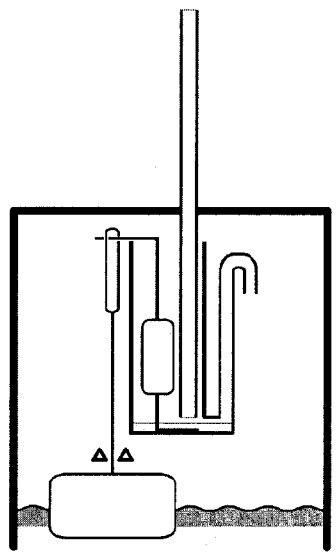

For this embodiment of the present invention the control valve 6, 7, 8 designed in the form of the liquid seal has a float 21 placed inside the dosing vessel 6 and connected to a flap 22 as well as an additional float 23 located directly inside the hot fluid vessel A. Moreover, the control valve has a string connecting mechanism 24 that interconnects both said floats (FIG. 11). After the level of the heat transfer agent inside the hot fluid vessel A has raised up to the elbow level of the siphon 7, the heat transfer agent fills the dosing vessel 6 via the siphon 7 and lifts up the float 21. The upward movement of the float results in lifting the flap 22 and shutting off the passage pipe 8 which commences the phase of forcing the heated fluid from the hot fluid vessel A via the cooler 1 to the cold fluid vessel B (FIG. 12). When the level of the liquid heat transfer agent inside the vessel A decreases to the height as determined by the length of the string connecting mechanism 24, the gravitational force exerted on the float 23 is transmitted to the float 21 via the string connecting mechanism 24. The float 21 sinks and thus the passage pipe 8 opens which enables equalization of the vapour pressure in the upper part of the circulating loop (FIG. 13).

Embodiment 7

Pressure Expansion Vessel

Figure 14:
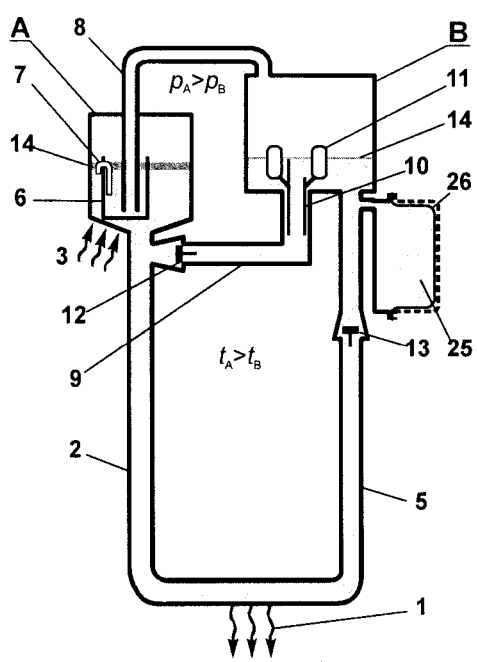
FIGS. 14 and 15 present a schematic diagram of the device with an anti-vacuum pressure expansion vessel.
Figure 15:
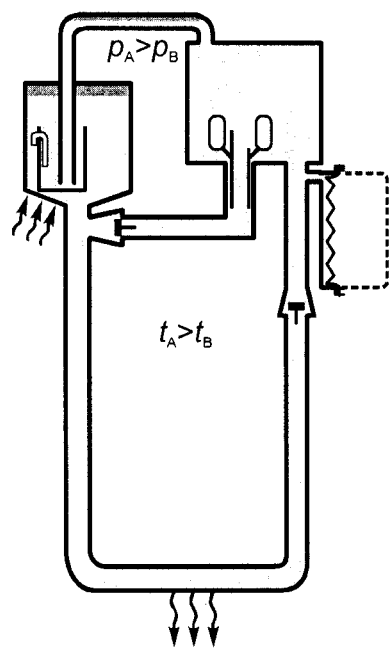

In order to prevent the formation of negative pressure when the temperature of liquid in the circulating loop drops below the boiling temperature of the pumping substance, the device as shown in FIG. 14 has a pressure expansion vessel 25 divided by means of an anti-vacuum membrane 26. One side of the pressure vessel is open to the ambient environment while the second side is connected to the ascending cold branch 5 just below the cold fluid vessel B. When temperature in the device drops below the boiling temperature of the pumping substance, the ambient pressure acts on the membrane 26 and enforces transfer of the heat-transfer agent from the vessel 25 to the device and the circulating loop is completely filled (FIG. 15). On the other hand, temperature growth leads to evaporation of the pumping substance that expels the heat-transfer agent from the device to the pressure extension vessel 25, where the amount of the expelled heat-transfer agent is determined by the vessel capacity.

What is claimed is:

1. The method for heat transfer in a direction reverse to natural convection is characterized in that an additional pumping substance is introduced to a heated area where the pumping substance is insoluble in a heat-transfer agent and its boiling temperature is lower than a boiling temperature of the heat-transfer agent, then the heat-transfer agent is heated so that the pumping substance is evaporated, and a generated vapour pressure is used to enforce circulation of the heat-transfer agent in a flow circuit whilst a spent vapour is transferred from an upper part of a hot falling branch to an area with a lower temperature where the spent vapour is condensed and a condensate is reintroduced to the heated area, moreover, the amount of the pumping substance is not less than it is necessary to fill a remaining part of the flow circuit free of the liquid heat-transfer agent with its vapour as well as to fill a condensate drainage path leading from a condensation area to an evaporation area;

whereas the condensate drainage path is an intermediate channel terminated with a telescopic pipe fixed in such a way that it has the possibility of unrestricted vertical movements inside the intermediate channel, whereas the inlet of the telescopic pipe is located outside the intermediate channel and is held by means of floats.

2. The method according to claim 1, is characterized in that the liquid pumping substance has preferably of less density than the heat-transfer agent.

3. A device for heat transfer in a direction reverse to the natural convection that is made as a closed circulating loop which incorporate two branches: a hot falling one and a cold rising one, where the both branches are mutually connected at one side via a cooler where at the other side these branches are terminated in two vessels, respectively, a hot one and a cold one, and the device has also a control valve which is implemented as a liquid seal with a passage pipe meant to connect vapour volumes of the mentioned vessels, and an intermediate channel to drain the heat-transfer agent from the cold fluid vessel to a hot one, and check valves to ensure unidirectional flow of liquids characterized in that its design incorporates technical means intended for vapour condensation of a pumping substance which is the a cold heat-transfer agent stored in the cold fluid vessel whilst vapours of the pumping substance is condensed by a direct contact with that a heat-carrying agent, whereas a means for drainage of condensate from the pumping substance is the intermediate channel terminated with a telescopic pipe fixed in such a way that it has the possibility of unrestricted vertical movements inside the intermediate channel, whereas the inlet of that the telescopic pipe is located outside the intermediate channel and is held just below the liquid surface in the cold fluid vessel by means of floats.

4. The device according to claim 3, characterized in that it has an expansion vessel for protecting against the pressure drop inside said device below the atmospheric pressure, which is open to the surrounding environment and provided with an anti-vacuum membrane, wherein the heat transfer agent is on one side of said membrane while on the other side of the membrane is medium under the ambient pressure, and the working capacity of said vessel is not less than the volume occupied by the vapour of the pumping substance, when the pressure in the device is equal or greater of ambient pressure.

* * * * *